United States Patent [19]

Kunz

[11] Patent Number: 4,702,810

[45] Date of Patent: Oct. 27, 1987

[54] PROCESS AND DEVICE FOR ADDING IONS TO LIQUIDS, PARTICULARLY AQUEOUS SOLUTIONS

[76] Inventor: Gerhard Kunz, Ruhrstrasse 111, D-5628 Heiligenhaus, Fed. Rep. of Germany

[21] Appl. No.: 813,259

[22] Filed: Dec. 24, 1985

[51] Int. Cl.⁴ .................... B01D 13/02; C25D 13/00
[52] U.S. Cl. .................... 204/182.4; 204/182.3; 204/182.5; 204/301
[58] Field of Search ............... 204/182.4, 301, 182.5, 204/182.3

[56] References Cited

U.S. PATENT DOCUMENTS

| | | | |
|---|---|---|---|
| 3,075,908 | 1/1963 | Kollsman | 204/180 P |
| 3,077,923 | 7/1972 | Gier | 204/301 |
| 3,496,081 | 2/1970 | Scheder | 204/301 |
| 3,510,417 | 5/1970 | Mizutani et al. | 204/182.4 |
| 3,607,694 | 9/1971 | Heit et al. | 204/182.4 |
| 3,645,884 | 2/1972 | Gilliland | |
| 3,649,511 | 3/1972 | Danly et al. | 204/182.4 |
| 3,677,923 | 7/1972 | Bier | 204/301 |
| 3,686,089 | 8/1972 | Korngold et al. | |
| 3,704,218 | 11/1972 | Kato et al. | 204/301 |
| 3,869,376 | 3/1975 | Tejeda | 204/301 |
| 4,111,780 | 9/1978 | Murayama et al. | 204/182.5 |
| 4,115,225 | 9/1978 | Parsi | 204/301 |
| 4,141,825 | 2/1979 | Conger | 204/182.5 |
| 4,148,708 | 4/1979 | Grant | 204/301 |
| 4,160,713 | 7/1979 | Matsuzaki et al. | 204/301 |
| 4,284,492 | 8/1981 | Karn | 204/301 |
| 4,295,950 | 10/1981 | Cole | 204/301 |
| 4,381,232 | 4/1983 | Brown | 204/182.4 |
| 4,465,573 | 8/1984 | O'Hare | 204/180 P |
| 4,539,088 | 9/1985 | Kaneda et al. | 204/301 |
| 4,539,091 | 9/1985 | Kaneda et al. | 204/301 |

FOREIGN PATENT DOCUMENTS

| | | |
|---|---|---|
| 0212364 | 8/1957 | Australia . |
| 3128584 | 11/1978 | Japan . |
| 0548355 | 4/1979 | Japan . |
| WO82/03994 | 11/1982 | PCT Int'l Appl. . |
| 0501431 | 2/1971 | Switzerland . |
| 1067567 | 5/1967 | United Kingdom . |

Primary Examiner—Arthur P. Demers
Attorney, Agent, or Firm—Fleit, Jacobson, Cohn & Price

[57] ABSTRACT

Process and apparatus adds counterions into the aqueous solution of an electrode chamber of an electrolytic desalination or demineralization unit. In the demineralization unit, oppositely charged ions are electrolytically generated within electrode chambers and defused into the stream of aqueous solution to be demineralized. In their migration in response to the application of an electric potential, the ion streams are subjected to displacement steps in cation and anion exchange masses separated by selectively permeable ion exchange membranes. A counterion-containing liquid is subjected to an electrical voltage field, separate or in conjunction with the desalination unit, and the counterions to be added are passed through a selectively permeable ion exchange membrane into the respective electrode chamber of chambers of the desalination unit.

24 Claims, 2 Drawing Figures

PROCESS AND DEVICE FOR ADDING IONS TO LIQUIDS, PARTICULARLY AQUEOUS SOLUTIONS

RELATED APPLICATION

The subject matter of this application is an improvement on my co-pending U.S. application, Ser. No. 736,198, filed May 20, 1985, which is a continuation of my earlier application, Ser. No. 573,940, filed Jan. 10, 1984, now abandoned.

FIELD OF THE INVENTION

The present invention relates to a process and device for adding ions to liquids, particularly aqueous solutions, in which the ions to be introduced are guided through selective barrier layers by means of an electric potential difference.

BACKGROUND OF THE INVENTION

It is known from my earlier application that in the desalination or demineralization of liquids, especially aqueous solutions, such as all types of water, in a succession of separate absorption and desorption processes, the ionic components of the dissolved salts present in liquid are absorbed on ion exchange layers and subsequently displaced from these exchange layers by ion streams produced in electrode chambers. In the production of these displacing ion streams in the electrode chambers, the counterions of the displacing ion streams are retained by means of selective barrier layers, so-called ion exchange membranes.

In the operation of such equipment, a disadvantage has been found in that the counterion concentration in the electrode chambers decreases continuously, resulting in increases in electrical resistance and energy consumption, and finally the desired desalination effect is reduced. It has also been found that this concentration decrease is due to counterions diffusing through the barrier membrane into the desalination chambers and then passing into the brine chamber, where they are flushed out with the brine.

SUMMARY OF INVENTION

The purpose of the present invention is to return the counterions diffusing out of the electrode chambers into the brine, back into the electrode chambers and/or adding fresh counterions to the electrode chambers, keeping the desired concentrations in the electrode chambers constant and performing this return and/or refeeding of counterions in a controlled manner. By so restoring the counterions, the device for performing the process is made practical for a wide range of counterion concentrations in the electrode chambers of a desalination unit.

In accordance with the present invention, this goal of adding counterions to the electrode chamber of a desalination unit is achieved by exposing a counterion-containing liquid to an electrical voltage field that is connected in parallel to the electrical voltage field of the desalination unit and is produced in a transfer chamber for counterions. The electical voltage is supplied to this transfer chamber by ionic conduction using the electrolyte fluids from the electrode chambers of the desalination unit and/or by electron conduction via electrodes, and the transfer chamber is shielded from the electrode chambers of the desalination unit by at least one barrier layer. The barrier layer for a cathodic electrode chamber is made permeable only to cations and impermeable to anions, and the barrier layer for an anodic electrode chamber is made permeable only to anions and impermeable to cations. Hence, cations passing through the cation-permeable barrier layer under the effect of an electric field can be conducted into the cathodic electrode chamber of the desalination unit, and the anions passing through the anion-permeable barrier layer under the effect of an electric field can be conducted into the anodic electrode chamber of the desalination unit.

In order to perform this process, a device can be used which consists of at least one vessel containing at least one transfer chamber for the counterion-containing fluid and at least one shield chamber. The chambers are equipped with inlet and outlet lines for liquids, and the transfer chamber is formed by ion exchange membranes as barrier layers. Each ion exchange membrance has a selective permeability for specific charge ions and is designed to be impermeable for oppositely charged ions and liquid. The inlet and outlet lines of the cathodic shield chamber lead to the cathode chamber of the desalination unit, and the inlet and outlet lines of the anodic shield chamber lead to the anode chamber of the desalination unit. The feed line to the transfer chamber is designed as a drain line.

The function of the invention is advantageously accomplished by the actions of the influence of the desalination unit's electrical potential difference on a counterion-containing liquid in a transfer chamber formed by ion exchange membranes, in order to cause the transfer or addition of cations into the cathode chamber of the desalination unit and/or the transfer or addition of anions into the anode chamber of the desalination unit. Specifically, the advantages are as follows:

a. The transfer or addition of counterions into the respective electrode chambers of the desalination unit compensate for losses of counterions in the electrode chambers arising during the desalination process. By means of this transfer, the counterion concentration and thus the electrical resistance in the electrode chambers is kept constant, and a uniformly good desalination effect is obtained in the desalination unit.

b. An advantage of the process in accordance with one form of the invention is that a more cost-effective compensation for the loss of counterions is achieved through the use of counterions from the waste brine.

c. An additional advantage of the process in accordance with the invention is that as a result of the transfer of counterions into the corresponding electrode chambers of the desalination unit, the desired concentation is adjusted without interrupting operation.

d. A particular advantage of the invention is that by using the electrical voltage potential of the desalination unit itself, the apparatus designed to add the counterions to establish the concentation in the electrode chambers is simple and easy to handle.

Additional advantageous developments of the invention from the standpoint of process and equipment technology can be taken from the description of the preferred embodiments.

DESCRIPTION OF THE DRAWINGS

Several nonlimiting exemplified embodiments of the invention are schematically represented in the drawings as follows.

Figure 1:
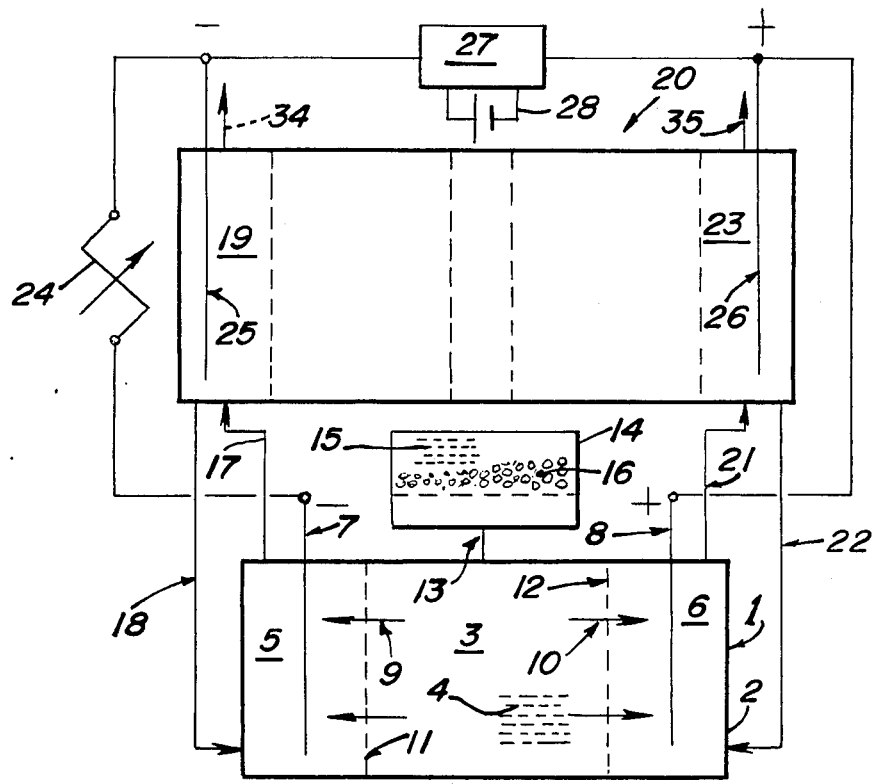
FIG. 1 shows a central longitudinal section through a device in accordance with the present invention, in which are shown, in a vessel, a transfer chamber with two shield chambers and a vessel connected to the transfer chamber for counterion-containing liquid.

Device 1 in accordance with the invention, depicted in FIG. 1, is essentially formed by a vessel 2 for a transfer chamber 3 provided therein, in which a liquid 4 containing the counterions is exposed to an electrical field, and for shield chambers 5, 6 also provided therein, in which the transfer of the counterions 9, 10 occurs under a voltage field, produced by electrodes 7, 8. Transfer chamber 3, which is delimited on its sides by barrier layers in the form of ion exchange membranes 11,12, has assigned to it a shield chamber 5 with a cathode 7 for cations 9 and a shield chamber 6 with an anode 8 for anions 10. Ion exchange membrane 11 between transfer chamber 3 and shield chamber 5 is designed so it allows cations 9 to pass through into shield chamber 5, but blocks the passage of liquid 4 and the passage of ions with a different charge. Ion exchange membrane 12 between transfer chamber 3 and shield chamber 6 is designed so it allows anions 10 to pass through into shield chamber 6, but blocks the passage of liquid 4 and the passage of the ions having a different charge.

The cationic counterions 9 include, for example, sodium ions, and the anionic counterions 10 include, for example, sulfate ions. The transfer chamber 3 is connected via feedline 13 to reservoir 14, in which are found a saturated counterion solution 15, for example, a sodium sulfate solution, and a stock 16, for example, of solid sodium sulfate. Shield chamber 5 is connected at its upper end to feedpipe 17 and at its lower end to gravity feed pipe 18 of cathode chamber 19 of a desalination or demineralization unit 20. Shield chamber 6 is connected at its upper end to feedpipe 21 and at its lower end to gravity feedpipe 22 of anode chamber 23 of the desalination unit. Cathode 7, which projects into the shield chamber 5, is connected to cathode 25 of desalination unit 20, via at least one control device 24. Anode 8, which projects into shield chamber 6, is connected to anode 26 of desalination unit 20. The electrodes 25 and 26 of desalination unit 20 are connected to power supply 27 of direct current source 28.

Figure 2:
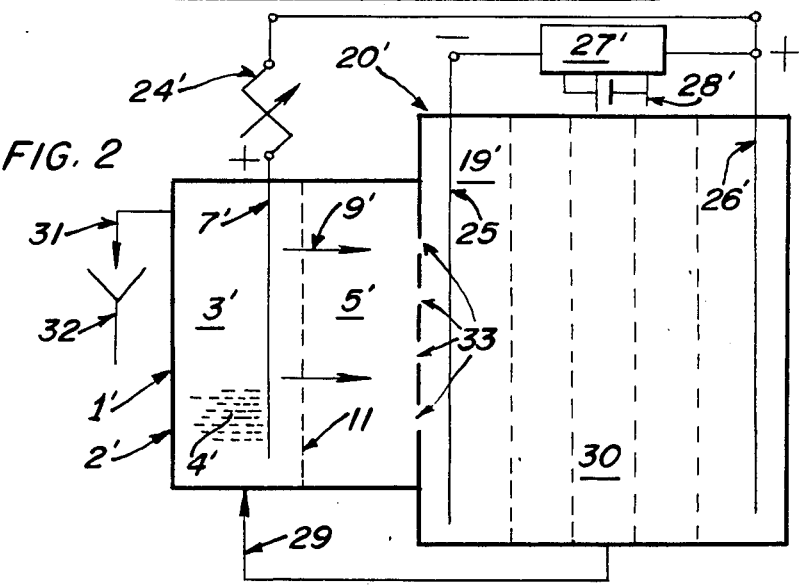
FIG. 2 shows a longitudinal section through a device in accordance with the present invention, in which are shown, in a vessel, a transfer chamber with a shield chamber and the inlet line for counterion-containing waste brine (concentrate) of a desalination unit.

The exemplified embodiment of the invention in accordance with FIG. 2 corresponds in principle to the previously described exemplified embodiment but differs from it in that the addition or transfer of counterions takes place in only one of the electrode chambers of the desalination unit, and in that the waste brine (concentrate) of the desalination unit itself is used as the counterion source solution.

In the process in accordance with FIG. 2, device 1' is formed by vessel 2' containing transfer chamber 3', in which liquid 4' containing the counterions is exposed to an electric field. Shield chamber 5' is also provided, in which the transfer of counterions 9' occurs in a voltage field provided by electrode 7' and electrode 25' of the desalination unit 20'. Transfer chamber 3', which is delimited on its sides by a barrier layer in the form of ion exchange membrane 11', has assigned to it shield chamber 5' for cations 9'. Ion exchange membrane 11' between transfer chamber 3' and shield chamber 5' is designed so it allows cations 9' to pass through into shield chamber 5' but blocks the passage of liquid 4' and the passage of ions having a different charge. In this process, cationic counterions 9' are defined, for example, as sodium ions.

Transfer chamber 3' is connected at its lower end with line 29 from brine chamber 30 of desalination unit 20' and is provided at its upper end with outlet line 31 to waste 32. Shield chamber 5' is connected via several passage openings 33 to cathode chamber 19' of desalination unit 20'. Anode 7', which projects into transfer chamber 3', is connected via at least one control device 24' to anode 26' of desalination unit 20'. Electrodes 25' and 26' of desalination unit 20' are connected to power supply 27' of direct current source 28'.

The addition or transfer of counterions 9, 10 from the liquid 4 located in transfer chamber 3 through ion-exchange membranes 11, 12 into the shield chambers 5, 6 is accomplished by the action of an electric field between electrodes 7, 8. The reservoir 14 contains stock 16 in solid form, for example, of sodium sulfate, and saturated solution 15, which in this example contains sodium ions and sulfate ions as the counterions. Line 13 forms the connection between reservoir 14 and transfer chamber 3, in which, through the migration of these ions 9, 10 their concentration in the liquid is reduced. This concentration reduction also results in a reduction of the specific gravity of solution 4, as a result of which solution 15, which is heavy due to saturation, flows by gravity through line 13 into transfer chamber 3. An equal amount of the lighter solution 4 is displaced upward into reservoir 14, through line 13 as well, where it takes up new counterions from stock 16 and once again forms concentrated solution 15.

In transfer chamber 3, under the influence of the electric field between electrodes 7, 8, cations 9, for example sodium ions, migrate through cation-permeable ion exchange membrane 11 into shield chamber 5, and anions 10, for example, sulfate ions, migrate through the anion-permeable ion exchange membrane 12 into shield chamber 6. At electrode 7, as a result of the generally known cathode reaction, the hydroxyl ions corresponding to the cathodic counterions 9 are produced as the anions, with gaseous hydrogen produced as a by-product. This hydrogen flows with counterions 9 that have migrated into shield chamber 5 and with the corresponding anions produced, for example, in the form of sodium hydroxide, as a gas-liquid mixture through pipeline 17 into cathode chamber 19 of desalination unit 20 itself. Hence, the loss of counterions, for example, sodium ions, is compensated for in this cathode chamber 19. The liquid fraction flowing out of shield chamber 5 through line 17 is replaced by a corresponding liquid fraction from cathode chamber 19 that flows through line 18 into shield chamber 5. The driving force for this circulation flow, which feeds the counterions through line 17, results from the difference in the specific gravities of the lighter gas-liquid mixture in line 17 and the heavier, gas-free, liquid in line 18. The hydrogen gas passing through line 17 into cathode chamber 19 escapes, together with the hydrogen gas formed at the electrode 25, through vent valve 34 of cathode chamber 19.

At electrode 8, as a result of the generally known anode reaction, the hydrogen ions corresponding to anodic counterions 10 are produced as cations with gaseous oxygen as a by-product. This oxygen flows with counterions 10, which have migrated into shield chamber 6, and the corresponding cations formed, for example, in the form of sulfuric acid, as a gas-liquid mixture through line 21 into the anode chamber 23 of actual desalination unit 20. Hence, the loss of counterions, for example, sulfate ions, in this anode chamber 23 is compensated for. The liquid fraction flowing through line 21 from shield chamber 6 is replaced by a corresponding liquid fraction from anode chamber 23 that flows through line 22 into shield chamber 6. The driving force for this circulating flow, which induces the supply of counterions through line 21, results from the difference in specific gravity between the lighter gas-liquid mixture in line 21 and the heavier, gas-free liquid in line 22. The oxygen gas passing through line 21 into anode chamber 23 escapes together with the oxygen gas formed at electrode 26 through vent valve 35 of anode chamber 23.

The losses of counterions in the electrode chambers of the desalination unit 20, for example, the loss of sodium ions in cathode chamber 19 and the loss of sulfate ions in anode chamber 23, can differ in amount depending on the operating conditions of the desalination unit, and require adjustment of the counterion addition. By means of control unit 24, for example, a controllable electrical resistor, the addition or transfer of an amount of counterions 9, 10 per unit time into shield chambers 5, 6 and through lines 17, 21 into electrode chambers 19, 23 is adjusted and adapted to the loss rates. By actuating control unit 24 manually and/or automatically, the electrical potential difference at electrodes 7, 8 and thus the electrical current flow between the electrodes 7, 8, are modified, and the addition of counterions 9, 10 into shield chambers 5, 6 and thus into electrode chambers 19, 23 is modified via the generally known electrochemical equivalence ratio.

Returning again to FIG. 2, the addition or transfer of counterions 9', for example cations, from a waste brine (concentrate) 4' produced in brine chamber 30 of desalination unit 20' and conveyed through line 29 to a transfer chamber 3', through ion exchange membrane 11' into shield chamber 5' occurs through the action of an electric field between electrode 7' arranged in transfer chamber 3' and electrode 25'. Electrode 25' is arranged in electrode chamber 19', for example, a cathode chamber of desalination unit 20'. At electrode 7', which is connected as an anode, through the generally known anode reaction, a hydrogen ion quantity per unit time is formed which is equivalent to the quantity of cations 9', for example, sodium ions, migrating during the same time period from transfer chamber 3', through ion exchange membrane 11'. Counterions 9', for example, cations such as sodium ions, migrating through ion exchange memberane 11' into the shield chamber 5', migrate through passage openings 33 into electrode chamber 19', for example, a cathode chamber, of a desalination unit 20' and compensate for the loss in this electrode chamber 19' of counterions, for example, sodium ions formed during the actual desalination process. The waste brine 4' introduced from the brine chamber 30 of desalination unit 20' through line 29' into transfer chamber 3', together with the electrolyte gas, for example, oxygen formed at the electrode 7', is passed through line 31 into channel 32.

The loss of counterions, for example, the loss of sodium ions, in the electrode chamber 19', for example, a cathode chamber of the desalination unit 20', can be of different magnitude depending on the operating conditions of the actual desalination process and may therfore necessitate a modifiation of the counterion addition. By means of control unit 24', for example, a controllable electrical resistor, the addition or transfer of counterions 9' per unit time is adjusted and adapted to the loss rate. By manual and/or automated operation of control unit 24' the electrical potential difference at electrodes 7' and 25' is modified, and via the generally known electrochemical equivalence ration, the introduction of couonterions 9' into the shield chamber 5', and thus into electrode chamber 19' can be modified.

While the foregoing is illustrative of the preferred embodiments of my invention, it will be understood by those skilled in the art that modifications and additions can be made without departing from the spirit of the invention. Hence, it is intended that the invention be limited only by the scope of the claims and their equivalents.

I claim:

1. A process for adding counterions to an electrode chamber of an electrolytic demineralization unit which comprises
   (a) establishing a secondary electric potential in parallel to the electric potential of the demineralization unit using a working electrode in said electrode chamber to which counterions are to be added and another oppositely charged electrode outside said demineralization unit; and
   (b) passing a counterion-containing solution through the secondary electric potential to migrate counterions toward the working electrode and away from said other electrode and through an ion exchange membrane which is permeable to said counterions but impermeable to oppositely charged ions.

2. The process in accordance with claim 1, wherein said working electrode is a cathode, said counterions are cations, and said ion exchange membrance is cation-permeable and anion-blocking.

3. The process in accordance with claim 1, wherein said working electrode is an anode, said counterions are anions, and said ion exchange membrane is anion-permeable and cation-blocking.

4. The process in accordance with claim 2, wherein said counterion containing solution is waste brine of said demineralization unit.

5. The process in accordance with claim 3, wherein said counterion containing solution is waste brine of said demineralization unit.

6. The process in accordance with claim 1, wherein the addition of counterions into the electrode chamber is regulated by varying the strength of the secondary electric potential.

7. The process in accordance with claims 2, in which the counterions are added into the electode chamber countinuously.

8. The process in accordance with claim 4, in which the counterions are added into the electrode chamber continuously.

9. The process for adding counterions to electrode chambers of an electrolytic demineralization unit which comprises:
   (a) generating cation and anion streams by exposing a salt containing solution to an electric potential;

(b) passing the cation stream through an ion exchange membrane which is cation-permeable, but blocks passage of said solution and anions, and into the cathode chamber; and (c) passing the anion stream through an anion exchange membrane which is anion-permeable, but blocks the passage of the salt containing solution and cations, and into the anode chamber.

10. The process in accordance with claim 9, wherein the addition of anions and cations to the respective anode and cathode chambers is regulated by varying the strength of the electric potential to which the salt containing solution is exposed.

11. The process in accordance with claim 9, wherein the anions and cations are added to their respective electrode chambers continuously.

12. The process in accordance with claim 9, wherein said salt containing solution is waste brine from said demineralization unit.

13. A process for replenishing counterions which diffuse out of an electrode chamber containing an electrode of an electrolytic demineralization unit, which comprises imposing an electric potential across a counterion-containing solution to migrate counterions toward the electrode and through an ion and liquid barrier means selectively permeable to said counterions, to thereby generate a counterion-rich solution adjacent said electrode, and tranferring said counterions in said counterion-rich solution to said electrode chamber.

14. The process in accordance with claim 13, wherein said counterion containing solution is waste brine from said demineralization unit.

15. A process for demineralizing an aqueous liquid containing salt, which comprises:
(a) passing the liquid through separate means for exchanging cations and for exchanging anions; the cation exchange means containing hydrogen ions and the anion exchange means containing hydroxyl ions, whereby cations and anions dissociated from the salt are exchanged for the hydrogen ions and the hydroxyl ions, thereby reducing the concentration of salts in the outflowing liquid;
(b) applying electric potential between an anode and a cathode across the direction of flow of the liquid, whereby hydrogen ions and hydroxyl ions migrating in opposite directions are exchanged for the cations and anions in the ion exchange means, thereby restoring said hydrogen and hydroxyl ions to the means, and displacing the cations and anions;
(c) receiving the displaced cations and anions in a flushing solution, whereby salts are formed and discharged with the flushing solution; and
(d) adding counterions adjacent to at least said anode or said cathode to replace athe counterions which diffuse away from said electrode.

16. The process in accordance with claim 15, wherein the electrode of sub-section (d) is the cathode and the counterions are cations.

17. The process in accordance with claim 16, wherein said counterions are obtained from the flushing solution after receiving the displaced cations and anions.

18. An apparatus for demineralizing an aqueous liquid containing salts, which comprises:
(a) a demineralization unit including a cathode, and anode, a means for exchanging anions and cations, and means for passing the liquid through said anion and cation exchanging means; and
(b) means for restoring counterions which diffuse away from either said cathode or anode.

19. The apparatus of claim 17, wherein said restoring means includes at least one additional electrode establishing an electric potential across a salt-containing solution whereby the counterions are caused to migrate toward the electrode of the demineralization unit adjacent which the counterions are to be restored.

20. The apparatus of claim 19, wherein said salt-containing solution is a flushing solution from said demineralization unit.

21. The apparatus of claim 19, wherein the electrode of the demineralization unit adjacent to which the counterions are to be restored is the cathode, the counterions are cations, the additional electrode is an anode, and is separated from said cathode of the demineralization unit by an ion exchange membrane means which is permeable to cations but impermeable to anions and liquid.

22. An apparatus in combination with an electrolytic demineralization unit for adding counterions to an electrode chamber thereof, which comprises:
(a) a secondary electrode;
(b) an ion exchange membrane means between said secondary electrode and said electrode chamber to which counterions are to be added, said membrane permeable to said counterions but impermeable to oppositely charged ions; and
(c) means to impress a direct electric current across said secondary electrode and a working electrode in said electrode chamber to create an electric potential across a salt-containing solution to migrate counterions in said solution toward the working electrode and away from said secondary electrode and through the ion exchange membrane means.

23. The apparatus of claim 22, wherein said secondary electrode is an anode, said working electrode is a cathode, said counterions are cations, and said ion exchange membrane means is permeable to cations, but impermeable to anions and said solution.

24. The apparatus of claim 22, wherein said salt-containing solution is waste brine from the demineralization unit.

* * * * *